(12) United States Patent
Nentwig et al.

(10) Patent No.: US 8,725,091 B2
(45) Date of Patent: May 13, 2014

(54) TRANSMITTER CONTROL

(75) Inventors: Markus Nentwig, Helsinki (FI); Ilkka Urvas, Espoo (FI)

(73) Assignee: Nokia Corporation, Espoo (FI)

( * ) Notice: Subject to any disclaimer, the term of this patent is extended or adjusted under 35 U.S.C. 154(b) by 415 days.

(21) Appl. No.: 12/994,043

(22) PCT Filed: May 20, 2009

(86) PCT No.: PCT/FI2009/050422
§ 371 (c)(1),
(2), (4) Date: Nov. 22, 2010

(87) PCT Pub. No.: WO2009/141505
PCT Pub. Date: Nov. 26, 2009

(65) Prior Publication Data
US 2011/0086599 A1    Apr. 14, 2011

(30) Foreign Application Priority Data
May 21, 2008    (GB) .................................. 0809271.0

(51) Int. Cl.
*H03C 1/62*    (2006.01)
*H04B 17/00*    (2006.01)

(52) U.S. Cl.
USPC ........................................ 455/115.3; 455/561

(58) Field of Classification Search
USPC .......... 455/115.1–115.4, 127.1, 127.2, 550.1, 455/552.1, 560, 561
See application file for complete search history.

(56) References Cited

U.S. PATENT DOCUMENTS

| | | | |
|---|---|---|---|
| 2,070,708 A | 2/1937 | Brokaw | |
| 4,323,731 A * | 4/1982 | Hershberger | ................... 381/16 |
| 5,712,593 A | 1/1998 | Buer et al. | |
| 7,260,138 B1 * | 8/2007 | Nakagawa | ................... 375/146 |
| 2003/0114127 A1 * | 6/2003 | Baldwin | ................... 455/245.1 |
| 2003/0199257 A1 | 10/2003 | Wilkinson et al. | |
| 2006/0148421 A1 | 7/2006 | Huang et al. | |
| 2007/0207783 A1 | 9/2007 | Ye et al. | |
| 2008/0280575 A1 | 11/2008 | Pesola | |
| 2009/0021303 A1 | 1/2009 | Vinayak et al. | |
| 2009/0192738 A1 | 7/2009 | Nentwig | |
| 2009/0298522 A1 * | 12/2009 | Chaudhri et al. | ............. 455/509 |

FOREIGN PATENT DOCUMENTS

| | | |
|---|---|---|
| JP | 2003318748 A | 11/2003 |
| WO | 9512957 A1 | 5/1995 |
| WO | 2006040683 A2 | 4/2006 |
| WO | 2006049669 A1 | 5/2006 |

OTHER PUBLICATIONS

International Search Report for corresponding International Patent Cooperation Treaty Application PCT/FI2009/050422, dated Oct. 1, 2009, 5 pages.
Written Opinion of the International Searching Authority for corresponding International Patent Cooperation Treaty Application PCT/FI2009/050422, dated Oct. 1, 2009, 9 pages.

* cited by examiner

*Primary Examiner* — Nhan Le
(74) *Attorney, Agent, or Firm* — Harrington & Smith (57) ABSTRACT

Various embodiments are disclosed relating to techniques of controlling a transmitter. In accordance with an example embodiment of the present invention, a maximum level of signal distortion acceptable for a transmission from a transmitter may be determined based on information of operating characteristics of the transmitter and/or the environment in which the transmission is to be made.

17 Claims, 7 Drawing Sheets

TRANSMITTER CONTROL

RELATED APPLICATION

This application was originally filed as PCT Application No. PCT/FI20091050422 filed May 20, 2009, which claims priority benefit from Great Britain Patent Application No. 0809271.0, filed May 21, 2008.

The present invention relates to a technique of controlling a transmitter. In one embodiment, it relates to a technique of controlling a transmitter of a mobile device in a radio communication system in which a plurality of mobile devices simultaneously make transmissions to a common base station in respective frequency bands. High spectral efficiency can be achieved by using modulation formats that require linear power amplifiers. Current radio systems, for example GSM or WCDMA, demand a fixed minimum level of signal quality (spectral emission masks, adjacent channel power ratios, error vector magnitude), that must be met by a mobile transmitter for any transmission it makes in the radio system.

High linearity of the power amplifier produces less unwanted emissions, causing less interference with other transmissions in the same network, but such high quality transmissions are less power efficient, resulting in shorter operation time for a given battery capacity.

WO2006/40683 and WO2006/049669 describe techniques for controlling a power amplifier (PA) in such systems. WO2006/40683 describes a power level tracking technique for improving transmitter efficiency based on the output power of the signal. The PA operating voltage and bias current are adjusted based on the measured output power. WO 2006/049669 describes a technique in which PA parameters are controlled according to a power metric of the signal.

Also, it is considered that there is not much potential left in such a radio system for improvement in the capacity of a single radio link, because the exploitation of Turbo-codes and low-density parity-check codes (LDPC-codes) is considered to be already close to its predicted limit (Shannon's limit).

According to an embodiment of the present invention, there is provided a new technique by which, for example, transmitter power consumption can be further optimised and/or the throughput of a frequency spectrum assigned to a base station can be further increased.

According to the present invention, there is provided a method comprising: determining a maximum level of signal distortion acceptable for a transmission from a transmitter based on information of operating characteristics of the transmitter and/or the environment in which said transmission is to be made.

In one embodiment, the determining is carried out remotely of the transmitter, and further comprising generating a message for sending to the transmitter indicating the maximum level of signal distortion acceptable for the transmission from the transmitter.

In one embodiment, the method further comprises: receiving from the transmitter information of the signal distortion characteristics of the transmitter, and carrying out said determining on the basis of said information received from the transmitter.

In one embodiment, the information received from the transmitter specifies a signal distortion level for the transmitter in one or more frequency divisions.

In one embodiment, the method further comprises sending to the transmitter a message specifying the identity of said one or more frequency divisions.

In one embodiment, said message specifies the maximum level of acceptable signal distortion for one or more frequency divisions.

In one embodiment, the determining is carried out on the basis of information of the operating characteristics of one or more other transmitters making other transmissions at the same time as said transmission from said transmitter, and/or on the basis of information as to whether or not other transmitters are making other transmissions in a channel adjacent to the channel for said transmission.

In one embodiment, the method further comprises specifying a first maximum level of acceptable signal distortion for said transmission from said transmitter, and specifying a second, different maximum level of acceptable signal distortion for a transmission from one of said other transmitters.

According to another aspect of the present invention, there is provided apparatus, which is configured to: determine a maximum level of signal distortion acceptable for a transmission from a transmitter based on information of operating characteristics of the transmitter and/or the environment in which said transmission is to be made.

In one embodiment, the apparatus is further configured to: generate a message for sending to the transmitter indicating the maximum level of signal distortion acceptable for the transmission from the transmitter.

In one embodiment, the apparatus is configured to: receive from the transmitter information of the signal distortion characteristics of the transmitter, and carry out said determining on the basis of said information received from the transmitter.

In one embodiment, the information received from the transmitter specifies a signal distortion level for the transmitter in one or more frequency divisions.

In one embodiment, the apparatus is configured to: send to the transmitter a message specifying the identity of said one or more frequency divisions.

In one embodiment, said message specifies the maximum level of acceptable signal distortion for one or more frequency divisions.

In one embodiment, the apparatus is configured to carry out the determining on the basis of information of the operating characteristics of one or more other transmitters making other transmissions at the same time as said transmission from said transmitter, and/or on the basis of information as to whether or not other transmitters are making other transmissions in a channel adjacent to the channel for said transmission.

According to another aspect of the present invention, there is provided a method comprising: receiving from a base station information indicating the maximum level of signal distortion acceptable for a transmission from the transmitter to the base station; and setting one or more variable parameters of the transmitter so as to not exceed said maximum level of acceptable signal distortion.

In one embodiment, the method further comprises sending to the base station information of the signal distortion characteristics of the transmitter.

In one embodiment, said information of the signal distortion characteristics of the transmitter specifies a signal distortion level of the transmitter in one or more frequency divisions.

In one embodiment, the method further comprises receiving from the base station a message specifying the identity of said one or more frequency divisions.

In one embodiment, said information indicating the maximum level of signal distortion acceptable for a transmission from the transmitter specifies a maximum level of acceptable signal distortion for one or more frequency divisions.

According to another aspect of the present invention, there is provided apparatus, which is configured to: receive from a base station information indicating the maximum level of signal distortion acceptable for a transmission from the transmitter to the base station; and set one or more variable parameters of the transmitter so as to not exceed said maximum level of acceptable signal distortion.

In one embodiment, the apparatus is further configured to send to the base station information of the signal distortion characteristics of the transmitter.

In one embodiment, said information of the signal distortion characteristics of the transmitter specifies a signal distortion level of the transmitter in one or more frequency divisions.

In one embodiment, the apparatus is further configured to: receive from the base station a message specifying the identity of said one or more frequency divisions.

In one embodiment, said information indicating the maximum level of signal distortion acceptable for a transmission from the transmitter specifies a maximum level of acceptable signal distortion for one or more frequency divisions.

According to another aspect of the present invention, there is provided a method comprising: determining a frequency spacing between simultaneous transmissions from a plurality of transmitters based on information of operating characteristics of the plurality of transmitters.

According to another aspect of the present invention, there is provided apparatus which is configured to: determine a frequency spacing between simultaneous transmissions from a plurality of transmitters based on information of operating characteristics of the plurality of transmitters.

According to another aspect of the present invention, there is provided a method comprising: selecting a frequency for a transmission from a transmitter based on information of the operating characteristics of the transmitter.

According to another aspect of the present invention, there is provided apparatus, which is configured to: select a frequency for a transmission from a transmitter based on information of the operating characteristics of the transmitter.

According to another aspect of the present invention, there is provided a computer program product comprising program code means which when loaded into a computer controls the computer to perform any method of the above-mentioned aspects/embodiments of the present invention.

An embodiment of the present invention is described hereunder, by way of example only, with reference to the accompanying drawings, in which.

Figure 1:
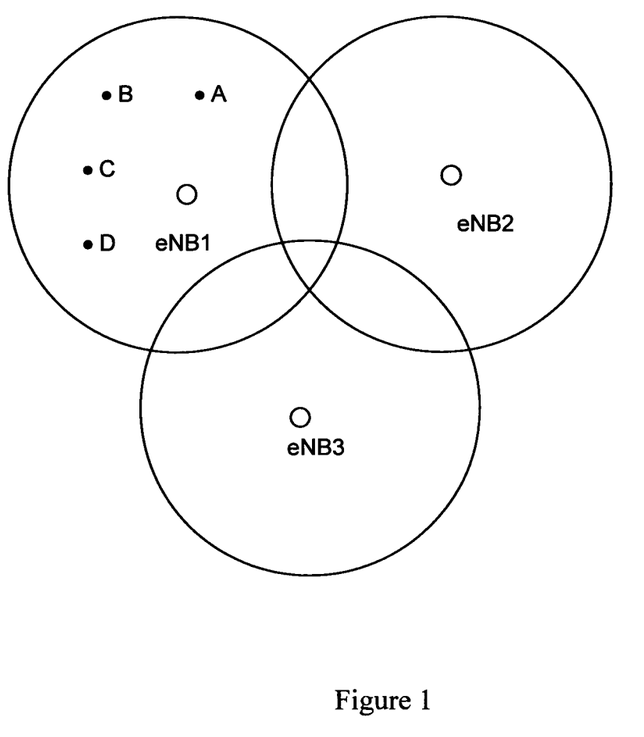
FIG. 1 illustrates an example of a system in which an embodiment of the present invention is implemented, including an access network comprising a plurality of base stations (eNBs) and a plurality of mobile devices within the cell associated with one of the base stations.

With reference to FIG. 1, mobile device A is in radio communication with a base station (eNB), which is also in simultaneous radio communication with a further mobile devices B, C and D.

Figure 2:
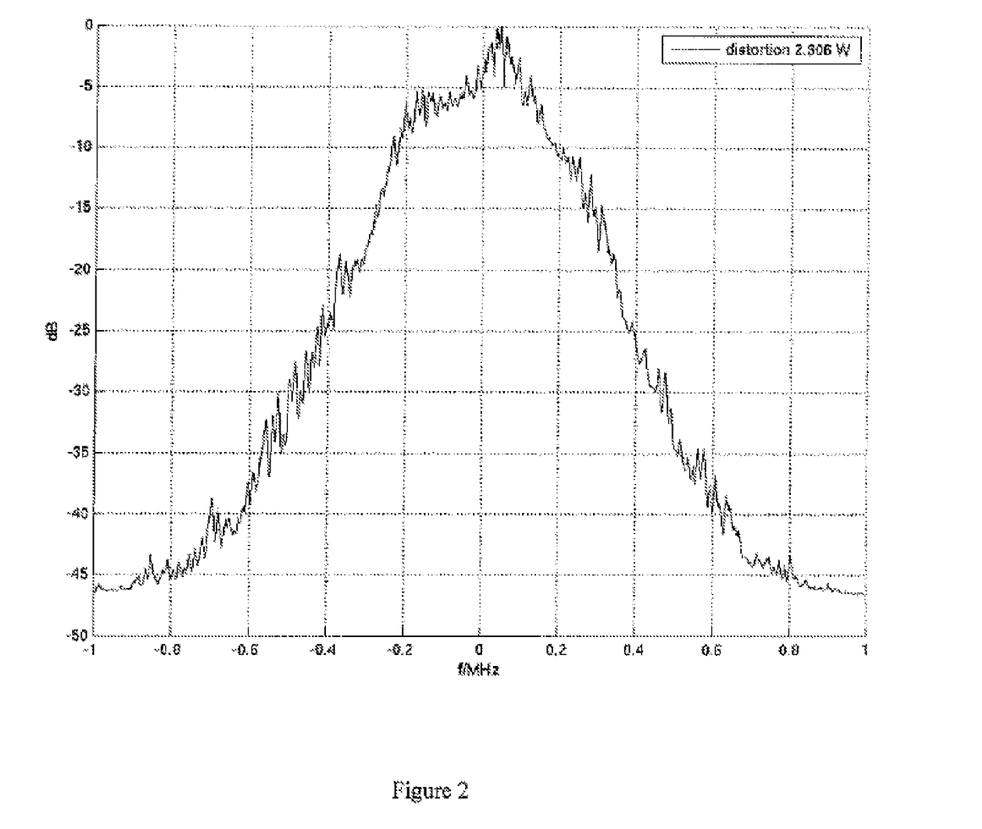
FIG. 2 illustrates an example of the distortion of a signal resulting from the nonlinearity of a mobile device transmitter.

The transmitter nonlinearity for mobile device A is modelled as AMAM/AMPM lookup table. AMAM (amplitude-to-amplitude modulation) is a distortion mechanism in power amplifiers and transmitters. AMPM (Amplitude-to-phase modulation) is another distortion mechanism. The model produces an estimate of only the distortion signal (i.e. excluding the linear term), as shown in FIG. 2. The model may be determined by mobile device A using a signal loopback technique, in which mobile device A transmits a signal at a particular frequency and receives its own transmitted signal using its own receiver tuned to the frequency of transmission. Such a loopback technique can be implemented in a time-domain multiplexed system (TDD) during idle periods of the receiver, or using a $2^{nd}$ (diversity or MIMO) receiver branch.

Figure 3:
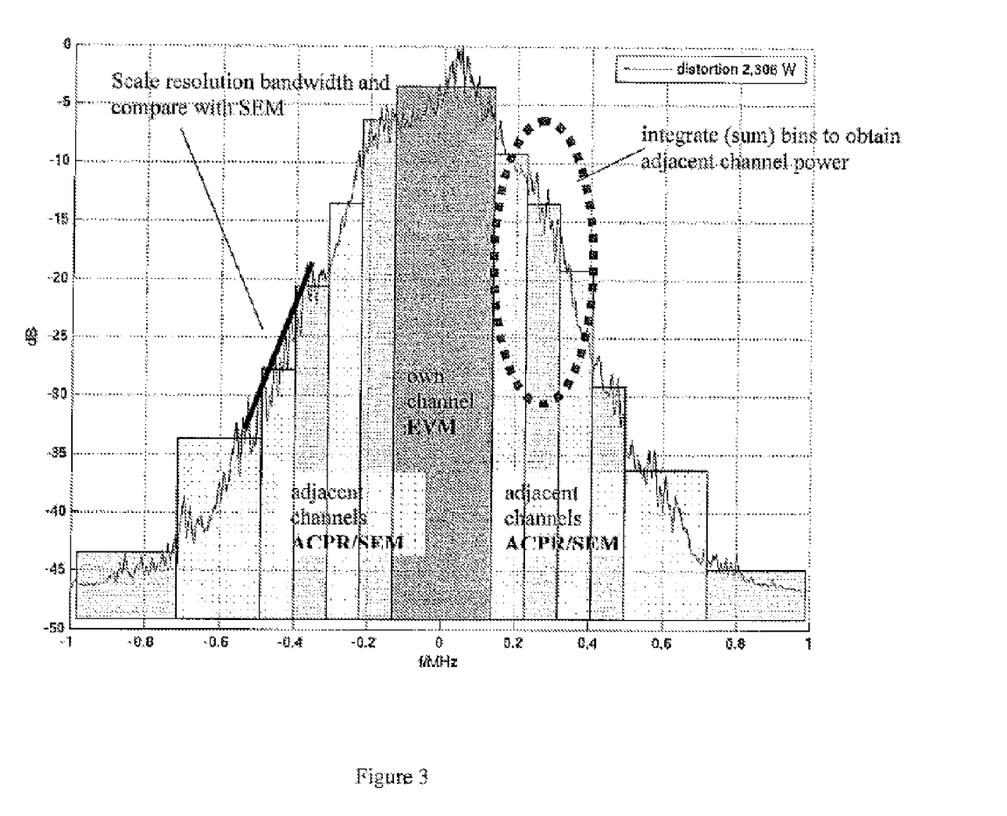
FIG. 3 illustrates an example of how the signal distortion of FIG. 2 can be represented as a histogram.

Alternatively, some data, for example, spectral emission estimates for a given transmitter configuration could be pre-computed and stored at the Mobile Device A. Mobile device A processes the distortion model data to produce a distortion power level for each of a number of frequency bins (frequency divisions). This is shown in FIG. 3 as a histogram of distortion power against frequency. The in-band bins are frequency bins in which signal distortion can affect error vector magnitude of the received signal at the base station, and the out-of-band bins are frequency bins in which the level of distortion determines adjacent channel power ratios and are relevant with regard to spectral emission constraints.

The identity (e.g. width and number) of the frequency bins can be chosen as needed. For example, they could be chosen according to instructions from radio resource managing entity of the access network. The radio managing resource entity could be part of the base station (eNB) or it could be a separate entity within the access network. For example, in some access networks, there may be no need for a detailed breakdown of unwanted emissions in the own channel bandwidth, but a higher resolution in adjacent channels may be beneficial. Some radio systems like IS-95 have a channel raster that is much smaller than the bandwidth. In this case, radio resource management for an access network operating in accordance with such a system may require high resolution information for distortion levels at outer frequencies, and make a decision on the basis of such information as to what is the optimum frequency spacing between different transmitters to achieve a good balance between interference and capacity (total number of channels). This is also useful for E-UTRAN, where there is the possibility to leave resource blocks (frequency regions) between two transmitters unoccupied.

Alternatively, the identity of the frequency bins used to communicate unwanted emission levels may be predetermined, for example by the specifications of the radio protocol.

Mobile Device A sends the signal distortion information represented by the histogram of FIG. 2 to the access network via the wireless interface between Mobile Device A and the base station (eNB). Mobile Device A thus communicates its current estimate of the distortion spectrum to the radio resource managing entity of the radio access network, which as discussed below is taken into account by the radio resource managing entity when making a decision as to what level of signal quality requirements to apply to a transmission from Mobile Device A.

Mobile Device A may also communicate capability and limit information to the radio resource managing entity in other forms. For example, Mobile Device A may present to the radio resource managing entity a choice of different possible trade-offs between the spectrum of unwanted emissions, transmit power and power consumption.

The access network determines a set of signal quality requirements for a data transmission between Mobile Device A and the base station (eNB), based on the signal distortion information received from Mobile Device A and/or on corresponding signal distortion information received from Mobile Devices B, C and D.

Examples of how the radio resource managing entity might function on the basis of signal distortion information received from Mobiles Devices A, B, C and D include the following:

1. Relax the linearity requirement for mobile devices for which the signal distortion information indicates the use of low-performance hardware (for example older generations of mobile devices), in order to maximize the average battery life time of all mobile devices. Alternatively, the radio resource management algorithm might be configured to enforce equal spectral emission requirements on all mobile devices to discourage use of obsolete and inefficient hardware.

2. Identify from the signal distortion information mobile devices that need to produce more adjacent channel emissions than others, and select transmission frequencies for any such mobile device around frequencies that are intentionally left unused or that are known to be capable of tolerating higher levels of interference.

3. Temporarily increase the linearity requirement for a mobile device whose transmitter emissions overlap a neighbouring channel that is in a deep fade (i.e. is suffering from strong destructive interference that might result in temporary failure of communication due to a severe drop in the channel signal-to-noise ratio).

4. Reduce the linearity requirements in areas where the network is only lightly loaded, allowing higher out-of-band emissions leading to longer battery operation time at the mobile devices, and enforce more stringent requirements in areas with heavy load to increase overall throughput at the expense of power efficiency.

The radio resource managing entity of the access network transmits to Mobile Device A (via the wireless interface between Mobile Device A and the base station (eNB)) information of the signal quality requirements in respect of one or more of in-band emission power level, error vector magnitude (EVM), adjacent channel power ratio (ACPR) and spectral emission mask (SEM). For example, the information might comprise information of a respective maximum distortion level in each of a plurality of frequency bins, as can be graphically represented by a histogram of the kind shown in FIG. 3.

The access network can thus dynamically update the signal quality requirements for the mobile device as part of radio resource management.

Mobile Device A then sets its transmitter so as to minimise battery current consumption whilst meeting the quality requirements specified in the message from the access network. This may involve, for example, one or more of: (i) controlling the supply voltage of the power amplifier directly or indirectly (for example through changing envelope tracking parameters); (ii) controlling the supply current of the PA (bias point); (iii) controlling predistortion settings and signal clipping to shape the spectrum of unwanted emissions according to the requirements; and (iv) controlling the load presented to the power amplifier.

For example, predistortion coefficients can be adapted, for example, by switching to soft clipping to move the majority of distortion products into the own channel (i.e. decrease the level of distortion at frequencies overlapping a neighbouring channel at the expense of increased distortion in the transmitter's own channel), when a neighbouring channel is very weak and the EVM requirements for the transmitter's own channel are relatively low). As mentioned above, power amplifier linearity is related to current consumption. Operating the mobile transmitter with no more than the minimum linearity that meets the requirements at the time in question (as determined by the access network) will result in longer operation/talk time for a given battery capacity.

Figure 4:
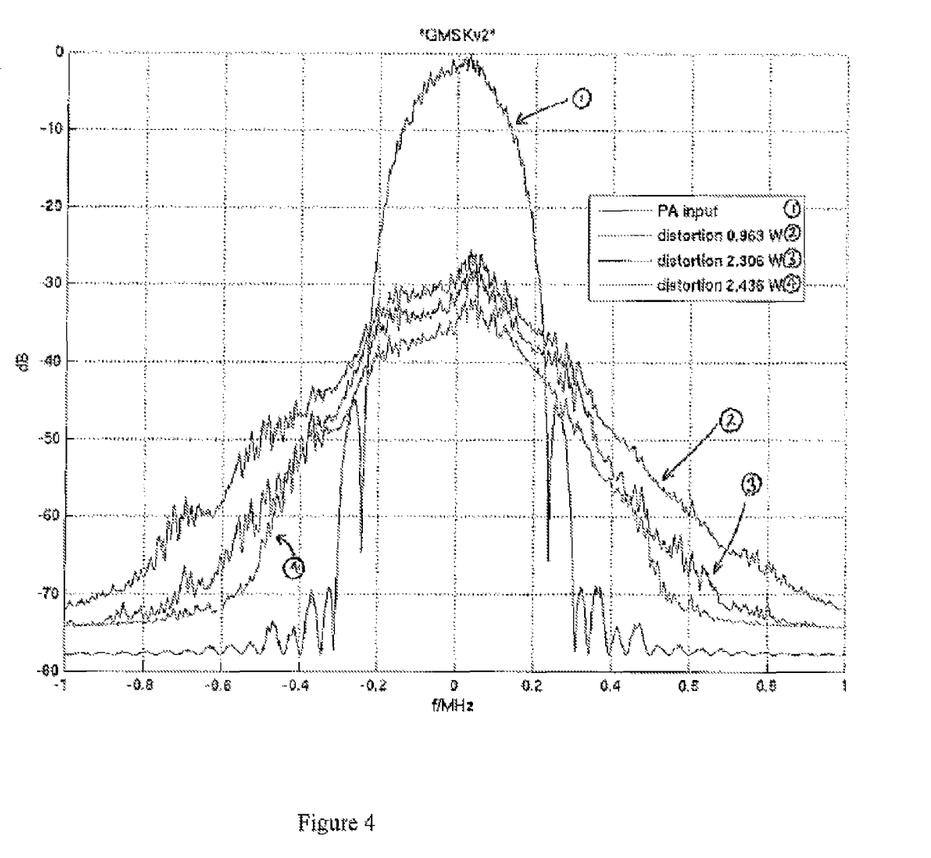
FIG. 4 illustrates how a change in signal quality requirements can affect power amplifier power consumption at a mobile device transmitter.
Figure 5:
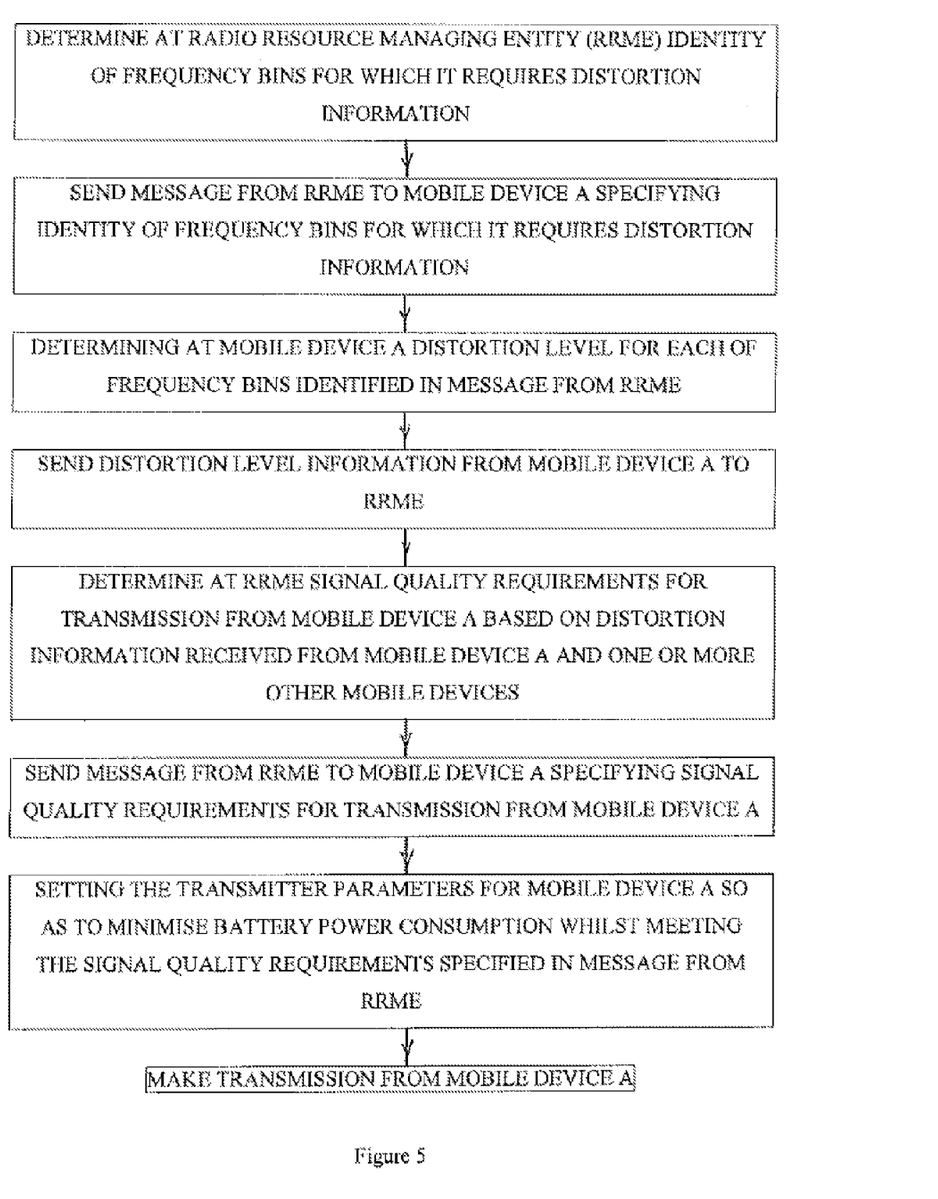
FIG. 5 illustrates a sequence of events in accordance with a first embodiment of the invention.
Figure 6:
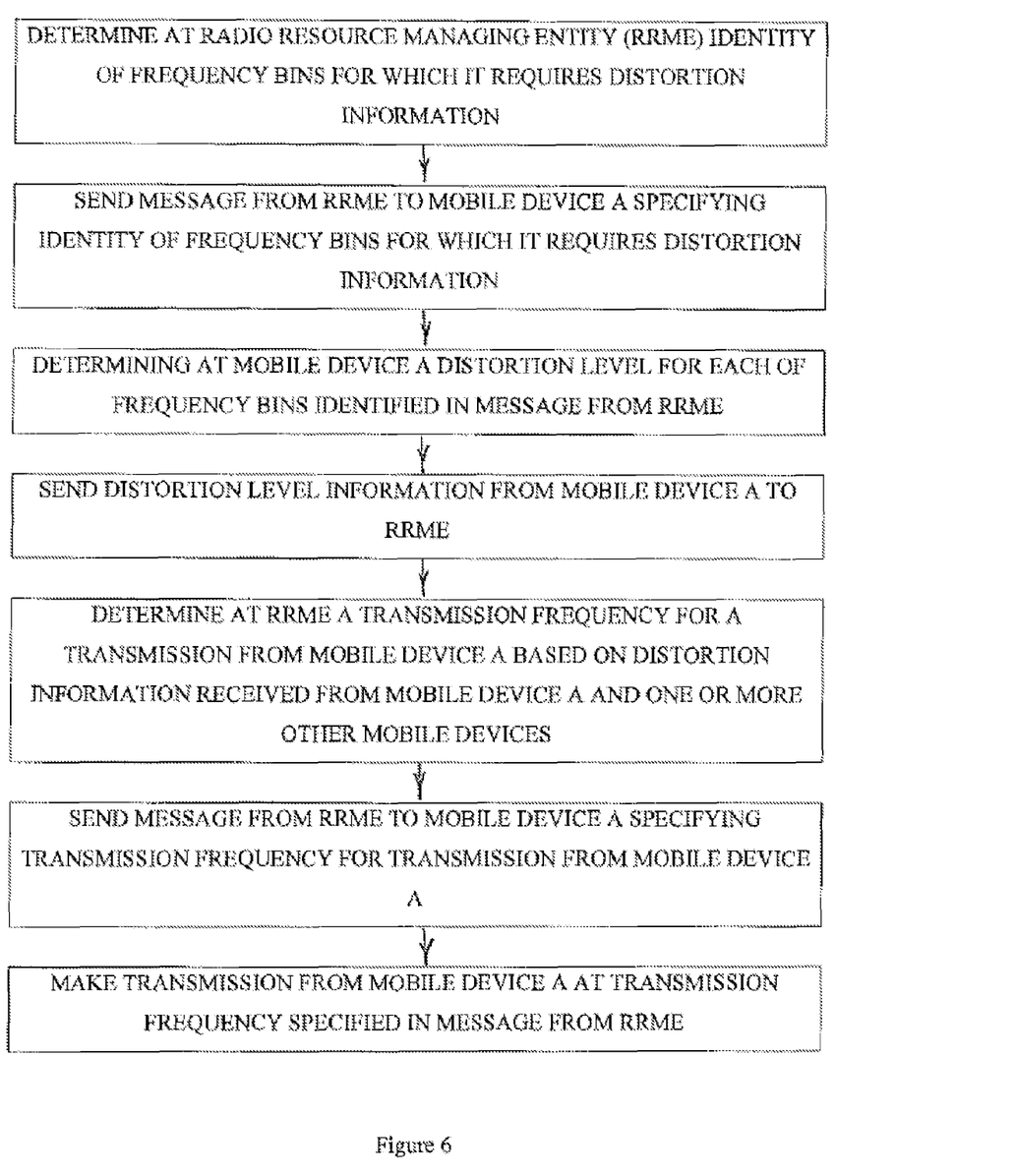
FIG. 6 illustrates a sequence of events in accordance with a second embodiment of the invention.
Figure 7:
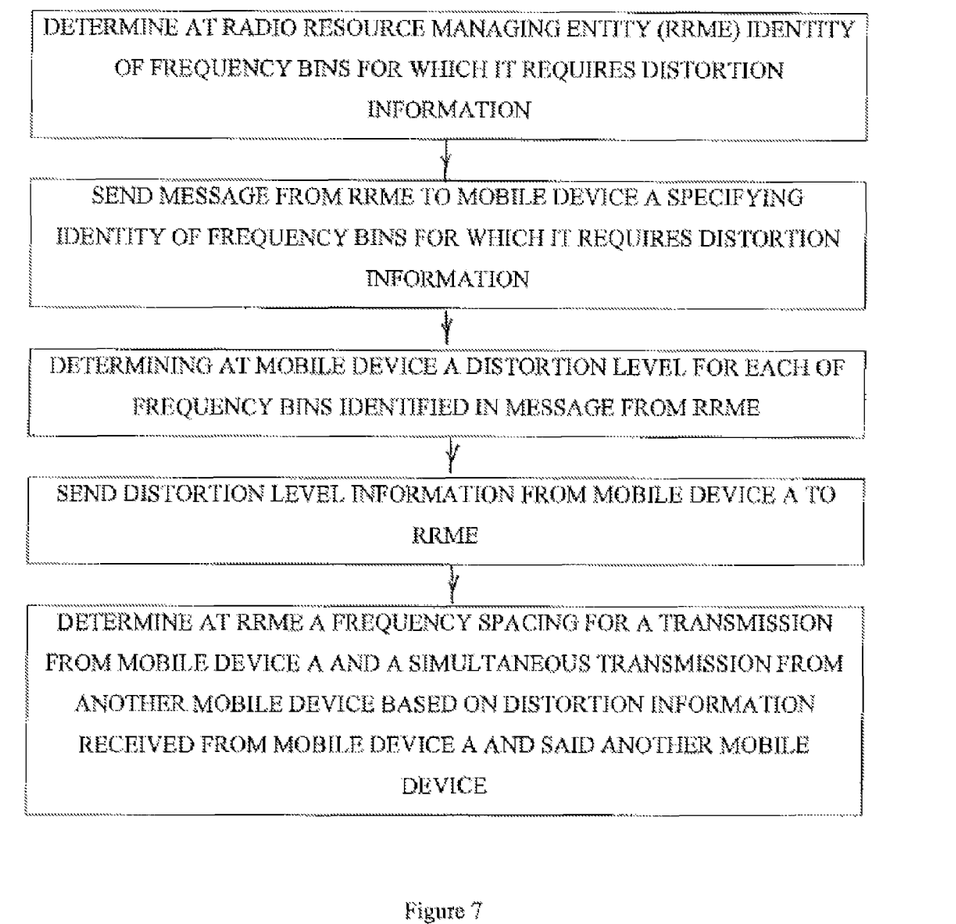
FIG. 7 illustrates a sequence of events in accordance with a third embodiment of the invention.

FIG. 4 illustrates how making a small reduction in signal quality (PA linearity) can have a significant beneficial effect on power consumption.

FIG. 4 shows the ideal spectrum ("PA input") and the resulting distortion products at three different bias points of the power amplifier. The in-band distortion products (within +/−200 kHz) appear as error vector magnitude of the own transmitted signal, the out-of-band products deteriorate the performance of adjacent channels. The power consumption of the PA is shown together with the trace (RF power: 26 dBm or ~0.4 W). In this particular example, a change in signal quality requirements of ~8 dB (EVM and/or ACPR) increases PA power consumption by 250%.

The above-described embodiment is considered to provide the following advantages:

(1) Better power efficiency for the mobile transmitter without needing extra hardware, leading to longer talk time, standby time, and less heating-up of the device. For example, a mobile transmitter can be controlled so as to operate more efficiently than it would if it were preconfigured to exceed the adjacent channel power requirements in average by several dBs, in order to ensure that it meets such requirements for transmissions under any kind of conditions;

(2) The frequency spectrum allocated to a base station (eNB) can be used more efficiently.

Appropriately adapted computer program code product may be used for implementing the functions of the mobile devices A to D and the radio resource managing entity. The program code product for providing the operation may be stored on and provided by means of a carrier medium such as a carrier disc, card or tape. Another possibility is to download the program code product via a data network.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method comprising: receiving from a base station information indicating a maximum level of signal distortion acceptable for a transmission from a transmitter to a base station; and setting one or more variable parameters of the transmitter so as to not exceed said maximum level of acceptable signal distortion.

2. The method according to claim 1, further comprising sending to the base station, information of the signal distortion characteristics of the transmitter.

3. The method according to claim 2, wherein said information of the signal distortion characteristics of the transmitter specifies a signal distortion level of the transmitter in one or more frequency divisions.

4. The method according to claim 3, comprising receiving from the base station, a message specifying the identity of said one or more frequency divisions.

5. The method according to claim 1, wherein said information indicating the maximum level of signal distortion acceptable for a transmission from the transmitter specifies a maximum level of acceptable signal distortion for one or more frequency divisions.

6. The method according to claim 1, wherein said information indicating the maximum level of signal distortion acceptable for a transmission from the transmitter specifies a maximum level of acceptable signal distortion for one or more frequency divisions.

7. An apparatus, configured to: receive from a base station, information indicating the maximum level of signal distortion acceptable for a transmission from the transmitter to the base station; and set one or more variable parameters of the transmitter so as to not exceed said maximum level of acceptable signal distortion; and send to the base station, information of the signal distortion characteristics of the transmitter.

8. The apparatus according to claim 7, wherein said information of the signal distortion characteristics of the transmitter specifies a signal distortion level of the transmitter in one or more frequency divisions.

9. The apparatus according to claim 8, configured to: receive from the base station, a message specifying the identity of said one or more frequency divisions.

10. The apparatus according to claim 7, wherein said information indicating the maximum level of signal distortion acceptable for a transmission from the transmitter specifies a maximum level of acceptable signal distortion for one or more frequency divisions.

11. A computer program product comprising a non-transitory computer-readable storage medium bearing computer program code embodied therein for use with a computer, the computer program code comprising:
   code for receiving from a base station information indicating a maximum level of signal distortion acceptable for a transmission from a transmitter to a base station; and
   code for setting one or more variable parameters of the transmitter so as to not exceed said maximum level of acceptable signal distortion.

12. The computer program product according to claim 11, wherein said information of the signal distortion characteristics of the transmitter specifies a signal distortion level of the transmitter in one or more frequency divisions.

13. The computer program product according to claim 12, further comprising code for receiving from the base station a message specifying the identity of said one or more frequency divisions.

14. An apparatus, comprising:
   at least one processor; and
   at least one memory including computer program code,
   the at least one memory and the computer program code configured, with the at least one processor, to cause the apparatus to perform at least the following:
   receive from a base station, information indicating the maximum level of signal distortion acceptable for a transmission from the transmitter to the base station; and
   set one or more variable parameters of the transmitter so as to not exceed said maximum level of acceptable signal distortion; and send to the base station, information of the signal distortion characteristics of the transmitter.

15. The apparatus according to claim 14, wherein said information of the signal distortion characteristics of the transmitter specifies a signal distortion level of the transmitter in one or more frequency divisions.

16. The apparatus according to claim 15, configured to: receive from the base station, a message specifying the identity of said one or more frequency divisions.

17. The apparatus according to claim 14, wherein said information indicating the maximum level of signal distortion acceptable for a transmission from the transmitter specifies a maximum level of acceptable signal distortion for one or more frequency divisions.

* * * * *